(12) United States Patent
Nakano

(10) Patent No.: US 12,020,424 B2
(45) Date of Patent: Jun. 25, 2024

(54) IMAGE INSPECTION DEVICE FOR INSPECTING IMAGE, IMAGE FORMING APPARATUS FOR FORMING IMAGE, AND PROGRAM FOR INSPECTION DEVICE

(71) Applicant: Konica Minolta, Inc., Tokyo (JP)

(72) Inventor: Tatsuya Nakano, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/177,233

(22) Filed: Mar. 2, 2023

(65) Prior Publication Data

US 2023/0281798 A1    Sep. 7, 2023

Related U.S. Application Data

(63) Continuation of application No. 17/885,889, filed on Aug. 11, 2022, now Pat. No. 11,605,160, which is a
(Continued)

(30) Foreign Application Priority Data

Sep. 28, 2018  (JP) ................................ 2018-184381

(51) Int. Cl.
*G06T 7/00* (2017.01)
*G06T 7/174* (2017.01)
(Continued)

(52) U.S. Cl.
CPC .............. *G06T 7/001* (2013.01); *G06T 7/174* (2017.01); *H04N 1/00045* (2013.01);
(Continued)

(58) Field of Classification Search
CPC ....... G06T 7/001; G06T 7/174; H04N 1/0009; H04N 1/00047; H04N 1/4446; H04N 1/00045; H04N 1/00769
See application file for complete search history.

(56) References Cited

U.S. PATENT DOCUMENTS

| 2010/0195123 | A1* | 8/2010 | Fujioka | .................. G06F 3/1207 358/1.14 |
| 2014/0168709 | A1 | 6/2014 | Tokumaru | |

(Continued)

FOREIGN PATENT DOCUMENTS

| JP | 2004252510 A | 9/2004 |
| JP | 2005136957 A | 5/2005 |

(Continued)

OTHER PUBLICATIONS

USPTO Notice of Allowance for corresponding U.S. Appl. No. 16/583,435 dated Jun. 23, 2021.
(Continued)

*Primary Examiner* — Christopher Wait
(74) *Attorney, Agent, or Firm* — CANTOR COLBURN LLP

(57) ABSTRACT

An image inspection device includes a hardware processor executing an inspection for a first read image generated by reading a first sheet on which one image is formed, based on a reference image. When an operation for newly generating the reference image is performed in association with the inspection for the first read image, the hardware processor acquires second read images generated by respectively reading second sheets on each of which the one image is formed and generates the reference image using the inspection for the first read image. When an operation for using the generated reference image stored in a storage unit is performed in association with the inspection for the first read image, the hardware processor uses the reference image in the storage unit for the inspection for the first read image, without newly acquiring the second read images.

22 Claims, 7 Drawing Sheets

Related U.S. Application Data continuation of application No. 17/481,428, filed on Sep. 22, 2021, now Pat. No. 11,455,717, which is a continuation of application No. 16/583,435, filed on Sep. 26, 2019, now Pat. No. 11,158,043.

(51) Int. Cl.
*H04N 1/00* (2006.01)
*H04N 1/44* (2006.01)

(52) U.S. Cl.
CPC ....... *H04N 1/00047* (2013.01); *H04N 1/0009* (2013.01); *H04N 1/00769* (2013.01); *H04N 1/4446* (2013.01)

(56) References Cited

U.S. PATENT DOCUMENTS

| | | |
|---|---|---|
| 2018/0260946 A1 | 9/2018 | Fan Jiang |
| 2020/0104987 A1 | 4/2020 | Nakano |
| 2022/0005176 A1 | 1/2022 | Nakano |
| 2022/0383474 A1 | 12/2022 | Nakano |

FOREIGN PATENT DOCUMENTS

| | | |
|---|---|---|
| JP | 2007089095 A | 4/2007 |
| JP | 2008066934 A | 3/2008 |
| JP | 2009230047 A | 10/2009 |
| JP | 2009246834 A | 10/2009 |
| JP | 2011112430 A | 6/2011 |
| JP | 2013215889 A | 10/2013 |
| JP | 2014137512 A | 7/2014 |
| JP | 2016001415 A | 1/2016 |
| JP | 2020049899 A | 4/2020 |

OTHER PUBLICATIONS

JPO Notice of Reasons for Refusal for corresponding JP Application No. 2018-18381; dated Jun. 21, 2022.

JPO Notice of Reasons for Refusal for corresponding JP Application No. 2021-153893; dated Nov. 16, 2021.

JPO Notice of Reasons for Rejection for corresponding JP Application No. 2021-109901; dated Jul. 13, 2021.

JPO Notice of Reasons for Rejection for corresponding JP Application No. 2021-153893; dated Oct. 12, 2021.

USPTO Non-Final Office Action for corresponding U.S. Appl. No. 16/583,435 dated Mar. 4, 2021.

USPTO Non-Final Office Action for corresponding U.S. Appl. No. 17/481,428, dated Jan. 21, 2022.

USPTO Notice of Allowance for corresponding U.S. Appl. No. 17/481,428, dated May 19, 2022.

USPTO Notice of Allowance for corresponding U.S. Appl. No. 17/885,889, dated Nov. 14, 2022.

* cited by examiner

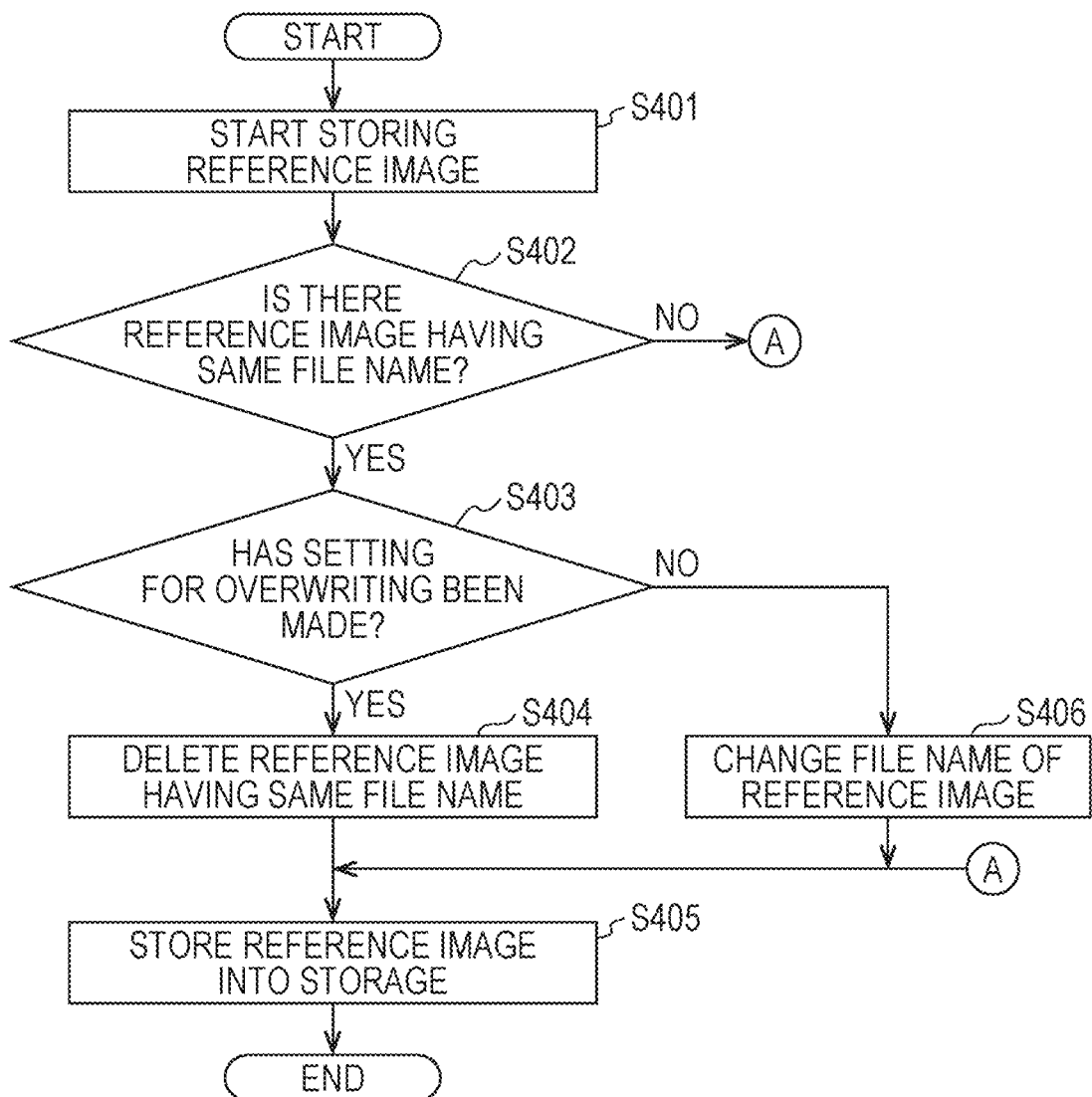

IMAGE INSPECTION DEVICE FOR INSPECTING IMAGE, IMAGE FORMING APPARATUS FOR FORMING IMAGE, AND PROGRAM FOR INSPECTION DEVICE

CROSS REFERENCE TO RELATED APPLICATIONS

The present application is a continuation application of U.S. application Ser. No. 17/885,889 filed Aug. 11, 2022, the entire contents of which are incorporated herein by reference. U.S. application Ser. No. 17/885,889 is a continuation of U.S. application Ser. No. 17/481,428, filed Sep. 22, 2021, (U.S. Pat. No. 11,455,717; Issued on Sep. 27, 2022), the entire contents of which are incorporated herein by reference. U.S. application Ser. No. 17,481,428 is a continuation application of U.S. patent application Ser. No. 16/583,435, filed on Sep. 26, 2019 (U.S. Pat. No. 11,158,043; Issued on Oct. 26, 2021), the entire contents of which are incorporated herein by reference. The U.S. application Ser. No. 16/583, 435 claimed the benefit of the date of the earlier Japanese Patent Application No. 2018-184381, filed on Sep. 28, 2018, priority to which is also claimed herein, and the contents of which are also incorporated by reference.

BACKGROUND

Technological Field

The present invention relates to an inspection device, an image forming apparatus, and a program for the inspection device.

Description of the Related Art

In a conventional example, after an image is formed on a paper sheet by an image forming apparatus, a scan image generated by reading the formed image is compared with a reference image that is a normal image serving as a reference in an inspection. In this manner, printed matter having an abnormality such as stains, creases, wrinkles, or skewing is detected as waste paper.

Regarding such a technology, JP2011-112430A discloses the following technology. An inspection image obtained by imaging a predetermined portion of printed matter in which the same pattern is repeatedly printed is compared with a reference image stored in advance, so that the inspection image is evaluated. In a case where the inspection image is determined to be defective, the inspection image is associated with the reference image and is recorded together with the reference image, and the inspection image and the reference image are displayed. In a case where a determination indicating that the portion determined to be defective is not a true defect is received by the user who has checked the displayed inspection image and the displayed reference image, the stored inspection image and the stored reference image are deleted.

However, in a case where an automatic inspection function that associates a print job for outputting printed matter of an inspection target with a reference image, and detects waste paper by comparing a scan image of an image formed on a paper sheet on the basis of the print job with the reference image is used, a plurality of reference images that has been generated and stored in advance is normally used when printing is performed in print settings being changed. Therefore, a large number of print jobs shares the automatic inspection function, and a large number of reference images is created. This takes up the capacity of a storage device. As a result, a newly generated reference image might not be stored, and the automatic inspection function becomes unusable. Also, to avoid overuse of the capacity of the storage device, the user needs to manually select and delete a reference image which is highly unlikely to be used in the future. By the above conventional technology, such a problem is not solved, because it is not possible to delete a reference images stored in advance.

SUMMARY

The present invention has been made to solve such problems. Specifically, the present invention aims to provide an inspection device, an image forming apparatus, and a program for the inspection device that are capable of preventing a decrease in productivity, without forcing the user to manually delete unnecessary reference images to avoid shortage of capacity in the storage due to the reference images generated and stored when an automatic inspection function is executed.

To achieve the abovementioned object, according to an aspect of the present invention, an inspection device reflecting one aspect of the present invention comprises an image reader that generates a scan image by reading an image formed on a recording medium by an image former on a basis of a print job, an inspector that inspects an inspection target image formed on a storage medium, by comparing a scan image with a reference image, the scan image being generated by reading with the image reader the inspection target image formed on a recording medium by the image former on a basis of a first print job, the reference image being a reference in an inspection of the inspection target image, a storage that stores the reference image, and a hardware processor that stores into the storage the reference image generated as the scan image by reading with the image reader an image formed on a recording medium by the image former on a basis of a second print job for generating the reference image, determines whether the reference image stored in the storage satisfies a predetermined condition when a data amount of the reference image stored in the storage becomes equal to or larger than a predetermined amount, and deletes the reference image determined to satisfy the predetermined condition from the storage.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a flowchart showing an operation of the image forming system.

DETAILED DESCRIPTION OF EMBODIMENTS

Figure 1:
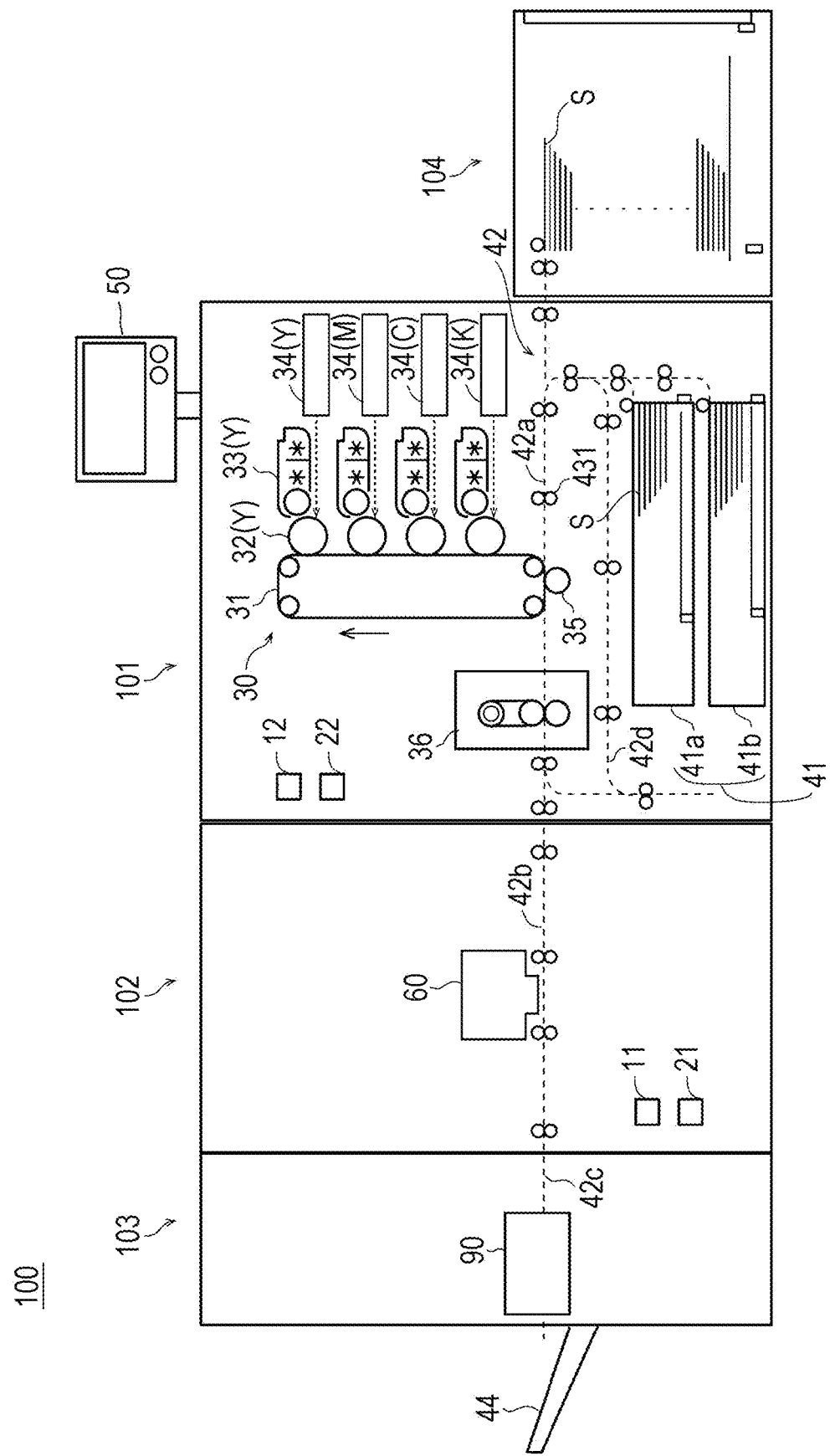
FIG. 1 is a schematic diagram showing the configuration of an image forming system.

Hereinafter, one or more embodiments of the present invention will be described with reference to the drawings. However, the scope of the invention is not limited to the disclosed embodiments. In the description below with reference to the drawings, like components are denoted by like reference numerals, and explanation of those components will not be repeated twice or more. The dimensional ratios in the drawings are increased for ease of explanation and may differ from the actual dimensional ratios.

(Image Forming System)

Figure 2:
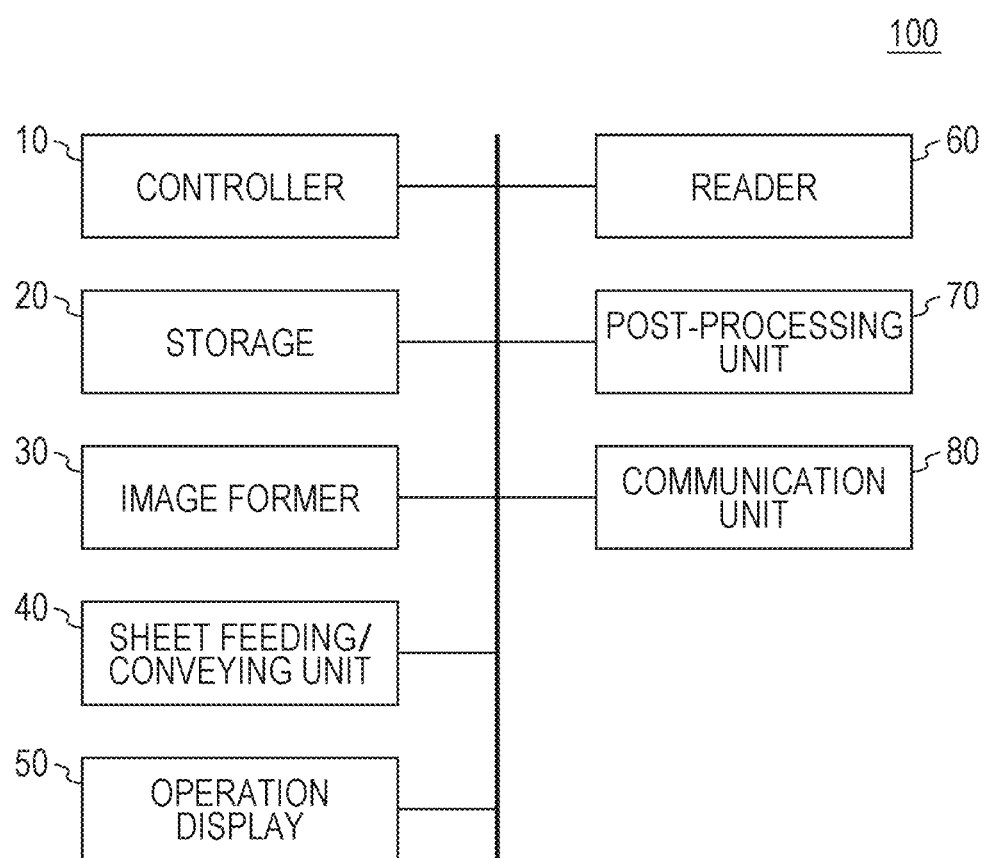
FIG. 2 is a block diagram showing the configuration of the image forming system.

FIG. 1 is a schematic diagram showing the configuration of an image forming system according to an embodiment of the present invention. FIG. 2 is a block diagram showing the configuration of an image forming system.

An image forming system 100 includes an image forming apparatus 101, a reading apparatus 102, a post-processing apparatus 103, and a sheet feeding apparatus 104. The image forming apparatus 101 performs image formation (printing) on a recording medium (a paper sheet, for example). In the description below, a paper sheet S is as an example of the recording medium. The reading apparatus 102 reads an image formed on a paper sheet S. The post-processing apparatus 103 performs post-processing on a paper sheet having an image formed thereon. The sheet feeding apparatus 104 supplies stored paper sheets S to an image former 30, in cooperation with a sheet feeder tray 41. Each of these apparatuses may include some other apparatus. For example, the image forming apparatus 101 may include the reading apparatus 102. The image forming system 100 may be a production printer.

As shown in FIG. 2, the image forming system 100 includes a controller 10, a storage 20, the image former 30, a sheet feeding/conveying unit 40, an operation display 50, a reader 60, a post-processing unit 70, and a communication unit 80. These components are mutually connected via a bus for exchanging signals between the components. The reader 60 forms an image reader.

The controller 10 is a CPU and performs control on each component and various kinds of arithmetic processing in accordance with a program. The controller 10 includes a controller 12 included in the image forming apparatus 101 and a controller 11 included in the reading apparatus 102, and these controllers cooperate to control the entire image forming system 100. The controller 10 and the reader 60 constitute an inspector. The control to be performed by the controller 10 will be described later in detail.

The storage 20 includes a storage 22 included in the image forming apparatus 101 and a storage 21 included in the reading apparatus 102. The storage 20 includes a ROM that stores various programs and various kinds of data, a RAM that serves as a work area to temporarily store programs and data, and a hard disk or the like that stores various programs and various kinds of data.

The image former 30 includes an intermediate transfer belt 31, photosensitive drums 32, developing units 33, writing units 34, and a secondary transfer unit 35.

The photosensitive drums 32, the developing units 33, and the writing units 34 each have configurations corresponding to the respective basic colors: yellow (Y), magenta (M), cyan (C), and black (K). In FIG. 1, reference numerals other than 32(Y) and 33(Y) are not shown for the photosensitive drums 32 and the developing units 33.

The writing units 34 of the image former 30 exposes the surfaces of electrically charged photosensitive drums 32 and form electrostatic latent images, on the basis of image data. In the developing units 33, the formed electrostatic latent images are developed with toners of the developing units 33, and toner images in the respective colors are formed on the surfaces of the respective photosensitive drums 32. These toner images are sequentially stacked on the intermediate transfer belt 31 by primary transfer units (not shown) of the respective colors, so that a full-color toner image is formed. This toner image is transferred onto a paper sheet S by the secondary transfer unit 35. After that, the paper sheet S having the toner image formed thereon is conveyed to a fixing unit 36, and the fixing unit 36 heats and presses the paper sheet S, to fix the full-color image to the paper sheet S.

The sheet feeding/conveying unit 40 includes the sheet feeder tray 41, conveyance paths 42 (42a through 42d), a plurality of conveyance rollers, a drive motor (not shown) for driving the conveyance rollers, and the sheet feeding apparatus 104.

The sheet feeding/conveying unit 40 rotates each conveyance roller at predetermined timing by driving of the drive motor, to convey a paper sheet S supplied from the sheet feeder tray 41 or the sheet feeding apparatus 104 to the image former 30.

In this example, the sheet feeder tray 41 is a two-stage pull-out tray formed with an upper tray 41a and a lower tray 41b each storing paper sheets individually, and supplies paper sheets to the image forming apparatus 101.

The sheet feeding apparatus 104 stores more paper sheets than the upper tray 41a and the lower tray 41b inside the image forming apparatus 101, and supplies paper sheets S to the image forming apparatus 101.

The conveyance paths 42 include conveyance paths 42a and 42d in the image former 30, a conveyance path 42b in the reading apparatus 102, and a conveyance path 42c in the post-processing unit 70.

A paper sheet S supplied from the sheet feeding apparatus 104 or the sheet feeder tray 41 is conveyed in the conveyance path 42a. Registration rollers 431 that adjust the timing to convey a paper sheet by rotating and stopping with a clutch is disposed in the conveyance path 42a.

A paper sheet S that has been conveyed in the conveyance path 42a and has an image formed thereon by the image former 30 passes through the conveyance paths 42a and 43c on the downstream side, is subjected to respective kinds of processing depending on the print settings for the print job. After that, the paper sheet S is ejected out of the machine and is placed onto a sheet catch tray 44. The print settings include "N in 1" (page assignment), setting of the number of copies to be made, stapling, punching, folding, watermarking, document orientation, sheet size, and grayscale setting, for example.

When the print settings for the print job are settings for double-sided printing, a paper sheet S having an image formed on one side (a first side, usually the front side) thereof is conveyed to the ADU conveyance path 42d located below the image former 30. The paper sheet S conveyed to the ADU conveyance path 42d is turned over in a switchback path. After that, the paper sheet S enters the conveyance path 42a, and an image is formed on the other surface (a second surface, normally the back surface) of the paper sheet S in the image former 30.

The operation display 50 includes a touch-panel display, a numeric keypad, a start button, and a stop button. The operation display 50 displays an input screen for inputting various instructions, a state of the apparatus, or the like, and receives various kinds of settings such as print settings, and various kinds of instructions. The operation display 50 functions as a receiver and a display.

The reader 60 generates a scan image in the conveyance path 42*b* by reading an image formed on a paper sheet S that is passing in the conveyance path 42*b*. The scan image may be data in a bitmap format, for example. The reader 60 functions as an image reader.

The reader 60 includes a line image sensor, a lens optical system, a light emitting diode (LED) light source, and a housing that houses these components, and reads an image formed on a paper sheet S being conveyed. In the image reading, light from the LED light source illuminates the surface of the paper sheet S passing through the reading position in the conveyance path 42*b*, and an image of the reading position is guided by the lens optical system, so that an image is formed on the line image sensor.

The post-processing unit 70 is disposed in the conveyance path 42*c*. The post-processing unit 70 performs a binding process, for example. The post-processing unit 70 includes a stacking unit that stacks paper sheets, and a stapling unit. After the stacking unit stacks a plurality of paper sheets S, the stapling unit performs a side stitching process using staples. The bundle of paper sheets S subjected to side stitching is ejected onto the sheet catch tray 44. Meanwhile, each paper sheet S not subjected to side stitching is ejected as it is through the conveyance path 42*c*.

The communication unit 80 may be any of the following various local connection interfaces: network interfaces compliant with standards such as SATA, PCI Express, USB, Ethernet (registered trademark), and IEEE 1394, and wireless communication interfaces such as Bluetooth (registered trademark) and IEEE 802.11. Through the communication unit 80, a print job including print data and print settings is received from an external terminal such as a PC.

On the basis of a print job, the controller 10 forms an image on a paper sheet S with the image former 30 and generates a scan image by reading the image formed on the paper sheet S with the reader 60. The controller 10 inspects the image formed on the paper sheet S by comparing the generated scan image with a reference image (a correct image) associated (linked) with the print job. Hereinafter, an inspection of an image formed on a paper sheet S will be simply referred to as "inspection". The reference image serves as a criterion for inspection, being a normal image. With this, an automatic inspection function is executed. In a case where the controller 10 determines, as a result of the inspection, that the image formed on the paper sheet S is abnormal, the controller 10 determines that the paper sheet S on which the image determined to be abnormal is formed is waste paper, and is ejected onto a waste sheet catch tray (not shown) that is prepared separately from the sheet catch tray 44. The abnormality in the image formed on the paper sheet S determined to be waste paper may include a stain, a corner bend, wrinkles, and skew. Hereinafter, a print job for forming an image to be inspected on a paper sheet S will be referred to as an inspection job. Further, an image to be inspected will be referred to as an inspection target image. As this inspection job is executed, a paper sheet S determined to be non-defective as a result of inspection is output as printed matter of a product. The inspection job forms a first print job.

On the basis of a print job for generating a reference image, the controller 10 forms an image on a paper sheet S with the image former 30 and generates a scan image to be used as the reference image by reading the image formed on the paper sheet S with the reader 60. After being determined to be normal through a visual inspection or the like conducted by the user, the generated scan image is associated as the reference image with an inspection job that is to use the reference image in the inspection and is stored into the storage 20. Hereinafter, the print job for generating the reference image will be referred to as the reference image generation job. The reference image generation job forms a second print job.

The reference image generation job may be a print job generated by changing the number of copies in an inspection job from two or larger to one, for example. Further, in the reference image generation job, print settings may be changed as necessary for each inspection job. When the reference image generation job is generated, the output mode may be a sample output mode or a proof output mode, for example. The sample output mode may be a mode in which one copy of printed matter is printed for any of the stored inspection jobs, and a scanned image of the printed matter is associated as the reference image with the inspection job and is stored together with the inspection job. The proof output mode may be a mode in which, when one copy of printed matter is printed and is determined to be normal through a visual inspection before an inspection job is executed, a scan image of the printed matter is stored as the reference image, is associated with the inspection job, the inspection is conducted, and the inspection job is then deleted from the storage 20 (or is not stored into the storage 20). In the description below, for ease of explanation, the reference image generation job is executed in the sample output mode unless otherwise specified When generating a reference image, the controller 10 performs control as follows. The controller 10 associates a reference image generated by executing the reference image generation job with an inspection job and stores the reference image into the storage 20. The reference image may be stored in the storage 21 of the reading apparatus 102, and the print job may be stored in the storage 22 of the image forming apparatus 101. When the data amount of the reference images stored in the storage 21 becomes equal to or larger than a predetermined amount, the controller 10 determines whether the stored reference images satisfy a predetermined condition. A reference image determined to satisfy the predetermined condition is then deleted from the storage 21. The amount of data serving as the criterion for determination of deletion of a reference image may be set at 90% to 100% of the storage capacity of the storage 21, for example. The predetermined condition includes the following conditions, for example.

(1) A reference image that has a frequency of usage for inspection equal to or lower than a predetermined frequency (a first condition). The predetermined frequency may be set at an appropriate value determined through an experiment or the like. For example, the predetermined frequency may be set as three to five times a month.

(2) A reference image that was stored into the storage 21 before a predetermined time and date, was last edited before the predetermined time and date, and/or was last used for inspection before the predetermined time and date (a second condition). The time and date when a reference image was stored into the storage 21, the time and date when the reference image was edited last time, and the time and date when the reference image was used for inspection last time may be stored as time stamps in the header of the file of the reference image. The predetermined time and date may be set at appropriate values determined through an experiment or the like. For example, the predetermined time and date may be set between a date and time one month ago and a date and time one year ago.

(3) A reference image not associated with an inspection job in a plurality of reference images that is to be used for inspection in the inspection job in the sample output mode and is stored in the storage 21 (a third condition).

(4) A reference image that is to be used for inspection of an inspection target image formed by executing an inspection job having a confidentiality level equal to or higher than a predetermined level (a fourth condition). The predetermined level may be set as appropriate in view of the security policy or the like of each organization. The job ID of an inspection job that uses the reference image for inspection may be stored in the header of the file of the reference image.

(5) A reference image that has been used in an executed inspection job in a setting in which a reference image used for inspection after execution of an inspection job is to be deleted (a fifth condition). The setting may be set in accordance with a user instruction that is input from the operation display 50.

(6) A reference image that meets at least one of the following set criteria: the expiration date of the reference image, the number of inspection jobs that have used the reference image in inspecting inspection target images, and the number of paper sheets on which inspection target images have been inspected with the use of the reference image (a sixth condition). The expiration date of the reference image, the number of inspection jobs that have used the reference image in inspecting inspection target images, and the number of paper sheets on which inspection target images have been inspected with the use of the reference image may be set in accordance with a user instruction that is input from the operation display 50.

(7) A reference image that corresponds to the other reference image in a setting in which another reference image having the same file name as a reference image being stored is already stored in the storage 21 and is to be overwritten by the reference image being stored (a seventh condition). The setting may be set in accordance with a user instruction that is input from the operation display 50.

(8) A reference image for which a deleting option has been received among a plurality of reference images displayed on the operation display 50 (an eighth condition). The deleting option may be received when reference images are displayed in the form of thumbnails or the like in a selectable manner on the operation display 50, for example.

(9) A reference image generated through execution of a reference image generation job in different print settings from the print settings of an inspection job in a case where a plurality of reference images to be used in inspecting inspection target images formed through execution of an inspection job are generated and stored by executing a plurality of reference image generation jobs having different print settings (a ninth condition).

(10) A reference image associated with an inspection job in a case where updating has been performed to change the print settings of the inspection job stored in the storage 21 or the storage 22 (a tenth condition). The changes in the print settings include a change in the page sequence, and a change in the position or the range of an image, for example.

The predetermined condition may be any one condition, or an AND or an OR of two or more conditions selected from the first through tenth conditions by the user.

Figure 3:
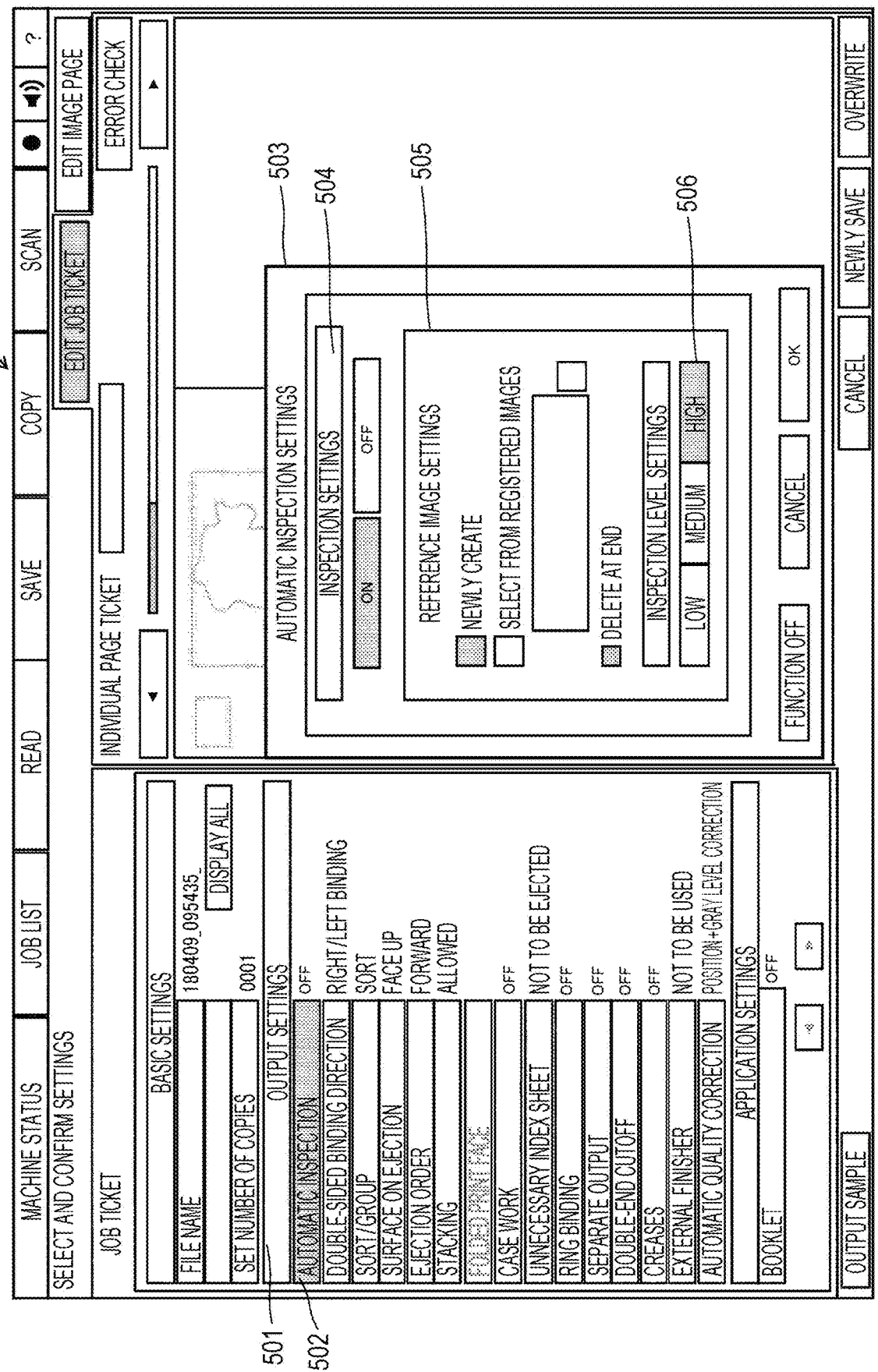
FIG. 3 is a schematic view of an automatic inspection setting screen for determining whether to save a reference image after execution of an inspection job.

FIG. 3 is a schematic view of an automatic inspection setting screen for determining whether to save a reference image after execution of an inspection job.

An automatic inspection setting screen 503 is displayed by selecting "automatic inspection" 502 from among the items in "output settings" 501 on a job ticket editing screen 500. The items other than the "automatic inspection" 502 among the items in the "output settings" 501 are the same as those in an image forming system having a conventional automatic inspection function, and therefore, are not described in detail herein.

The automatic inspection setting screen 503 includes "inspection settings" 504 for setting ON/OFF of the automatic inspection function, "reference image settings" 505 for determining whether to newly create a reference image or whether to select a reference image from among registered images, and "inspection level settings" 506 for setting an inspection level. In the example shown in FIG. 3, "ON" is selected in the "inspection settings" 504. "Newly Create" is selected, and "Delete at End" is selected in the "reference image settings" 505. "High" is selected in the "inspection level settings" 506. The inspection levels are the same as those in an image forming system having a conventional automatic inspection function, and therefore, is not described herein.

When the above selection is made, and an "OK" button is selected, "Newly Create" is selected, and settings are made so that a reference image to be used for inspection using the automatic inspection function is newly created. Further, as "Delete at End" is selected, settings are made so that the created reference image will be deleted from the storage 21 after execution of the inspection job. In this case, the fifth condition described above is set as the predetermined condition.

Operation of the image forming system is now described.

Figure 4:
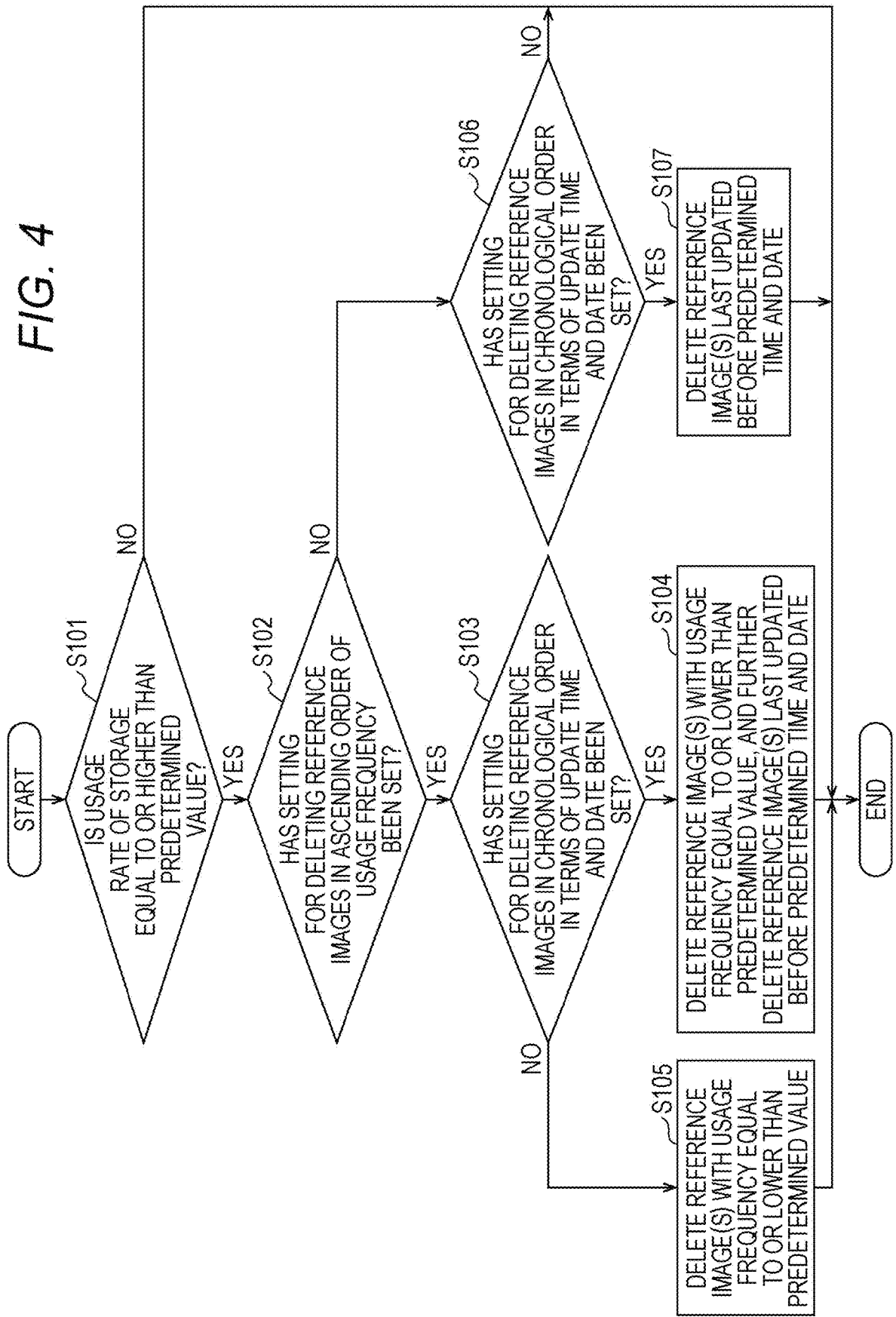
FIG. 4 is a flowchart showing an operation of the image forming system.

FIG. 4 is a flowchart showing an operation of the image forming system in a case where the first condition and the second condition are set as the predetermined condition for deleting a reference image. This flowchart may be executed by the controller 11 of the reading apparatus 102 in accordance with a program stored in the storage 21. Note that part of this flowchart may be executed by the controller 11 and the controller 12 cooperating with each other. Likewise, the flowcharts shown in FIG. 5 through FIG. 7 described later may also be executed by the controller 11 (or partially in cooperation with the controller 12) in accordance with a program.

The controller 11 determines whether the usage rate of the storage 21 is equal to or higher than a predetermined value (S101). The predetermined value may be 100%, for example. The usage rate of the storage 21 corresponds to the data amount of the reference images stored in the storage 21, and the usage rate and the data amount are convertible to each other. If the controller 11 determines that the usage rate of the storage 21 is not higher than the predetermined value (S101: NO), the controller 11 ends the process.

If the controller 11 determines that the usage rate of the storage 21 is higher than the predetermined value (S101: YES), the controller 11 determines whether a setting for deleting reference images in ascending order of usage frequency has been made (S102). The setting for deleting reference images in ascending order of usage frequency may be a setting for deleting the reference image(s) having a usage frequency equal to or lower than a predetermined value (three times a month, for example). If the controller 11 determines that the setting for deleting reference images in ascending order of usage frequency has been made (S102: YES), the controller 11 determines whether a setting for deleting reference images in chronological order in terms of update time and date has been made. (S103). The setting for deleting reference images in chronological order in terms of update time and date may be a setting for deleting the reference images that were last updated before a predetermined time and date (at least one month ago, for example). If the controller 11 determines that the setting for deleting reference images in chronological order in terms of update time and date has been made (S103: YES), the controller 11 deletes the reference image(s) having a usage frequency equal to or lower than the predetermined value, and further deletes the reference image(s) that was (were) last updated before the predetermined time and date (S104).

If the controller 11 determines that the setting for deleting reference images in chronological order in terms of update time and date has not been made (S103: NO), the controller 11 deletes the reference image(s) having a usage frequency equal to or lower than the predetermined value (S105).

If the controller 11 determines in step S102 that the setting for deleting reference images in ascending order of usage frequency has not been made (S102: NO), the controller 11 determines whether a setting for deleting reference images in chronological order in terms of update time and date has been made. (S106). If the controller 11 determines that the setting for deleting reference images in chronological order in terms of update time and date has not been made (S106: NO), the controller 11 ends the process.

If the controller 11 determines that the setting for deleting reference images in chronological order in terms of update time and date has been made (S106: YES), the controller 11 deletes the reference image(s) that were (was) last updated before the predetermined time and date (S107).

Figure 5:
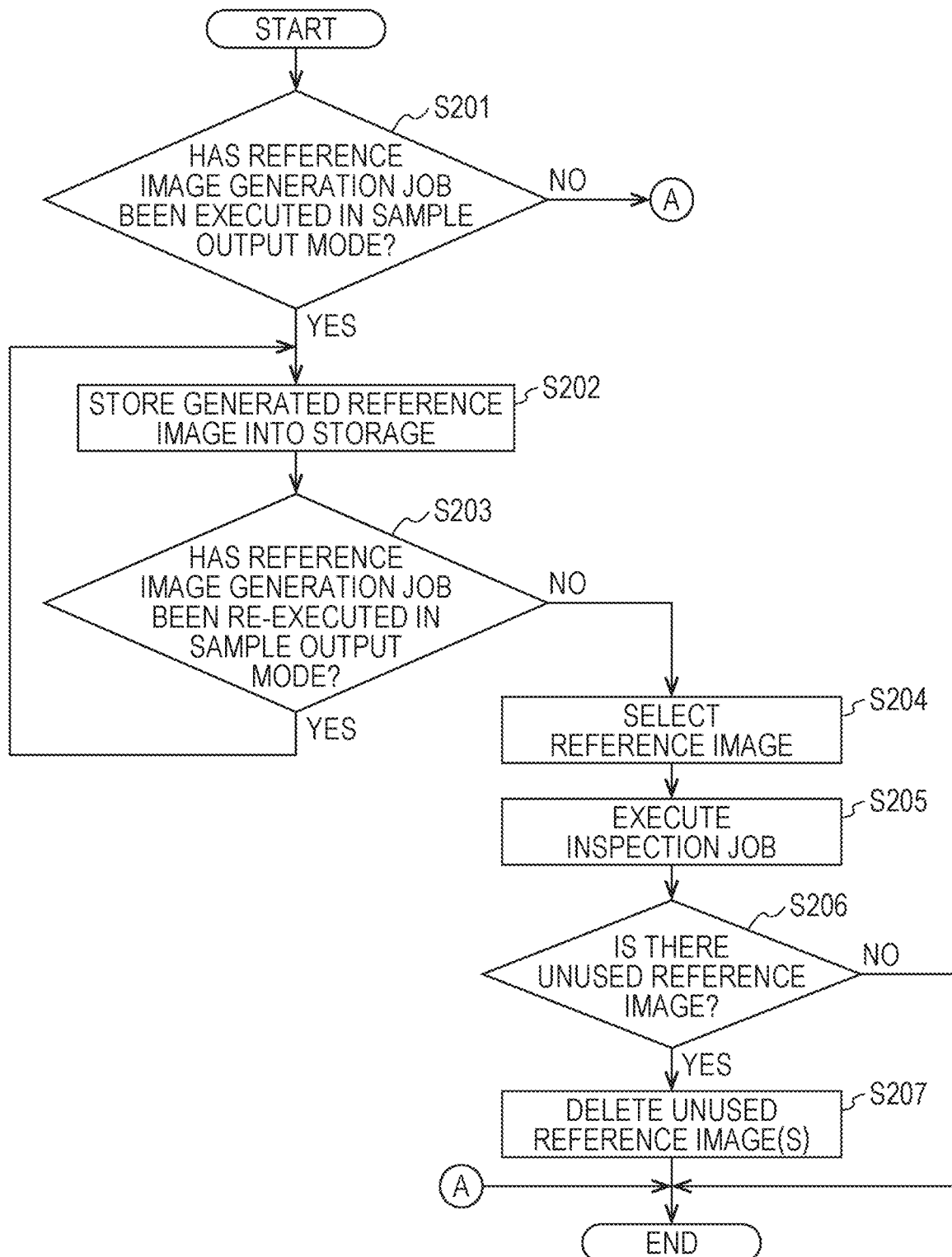
FIG. 5 is a flowchart showing an operation of the image forming system.

FIG. 5 is a flowchart showing an operation of the image forming system in a case where the third condition is set as the predetermined condition for deleting a reference image.

The controller 11 determines whether a reference image generation job has been executed in the sample output mode (S201). If the controller 11 determines that the reference image generation job has not been executed in the sample output mode (S201: NO), the controller 11 ends the process.

If the controller 11 determines that the reference image generation job has been executed in the sample output mode (S201: YES), the controller 11 stores the generated reference image into the storage 21 (S202), and then determines whether the reference image generation job has been re-executed in the sample output mode (S203). If the controller 11 determines that the reference image generation job has been re-executed in the sample output mode (S203: YES), the controller 11 stores the generated reference image into the storage 21 (S202), and then determines whether the reference image generation job has been re-executed in the sample output mode (S203). The controller 11 repeats steps S202 and S203.

If the controller 11 determines that the reference image generation job has not been re-executed in the sample output mode (S203: NO), the controller 11 selects a reference image to be used for inspection in an inspection job (S204) and executes the inspection job (S205).

The controller 11 determines whether the storage 21 stores reference images that have not been used for inspection in the inspection job (S206). That is, in a case where a plurality of reference images to be used in inspection jobs has been generated in the sample output mode, the controller 11 determines whether the storage 21 stores reference images not associated with the executed inspection job. If the controller 11 determines that any reference image not used for inspection in the inspection job is not stored in the storage 21 (S206: NO), the controller 11 ends the process.

If the controller 11 determines that the storage 21 stores one or more reference images not used for inspection in the inspection job (S206: YES), the controller 11 deletes the unused reference image(s) from the storage 21 (S207).

Figure 6:
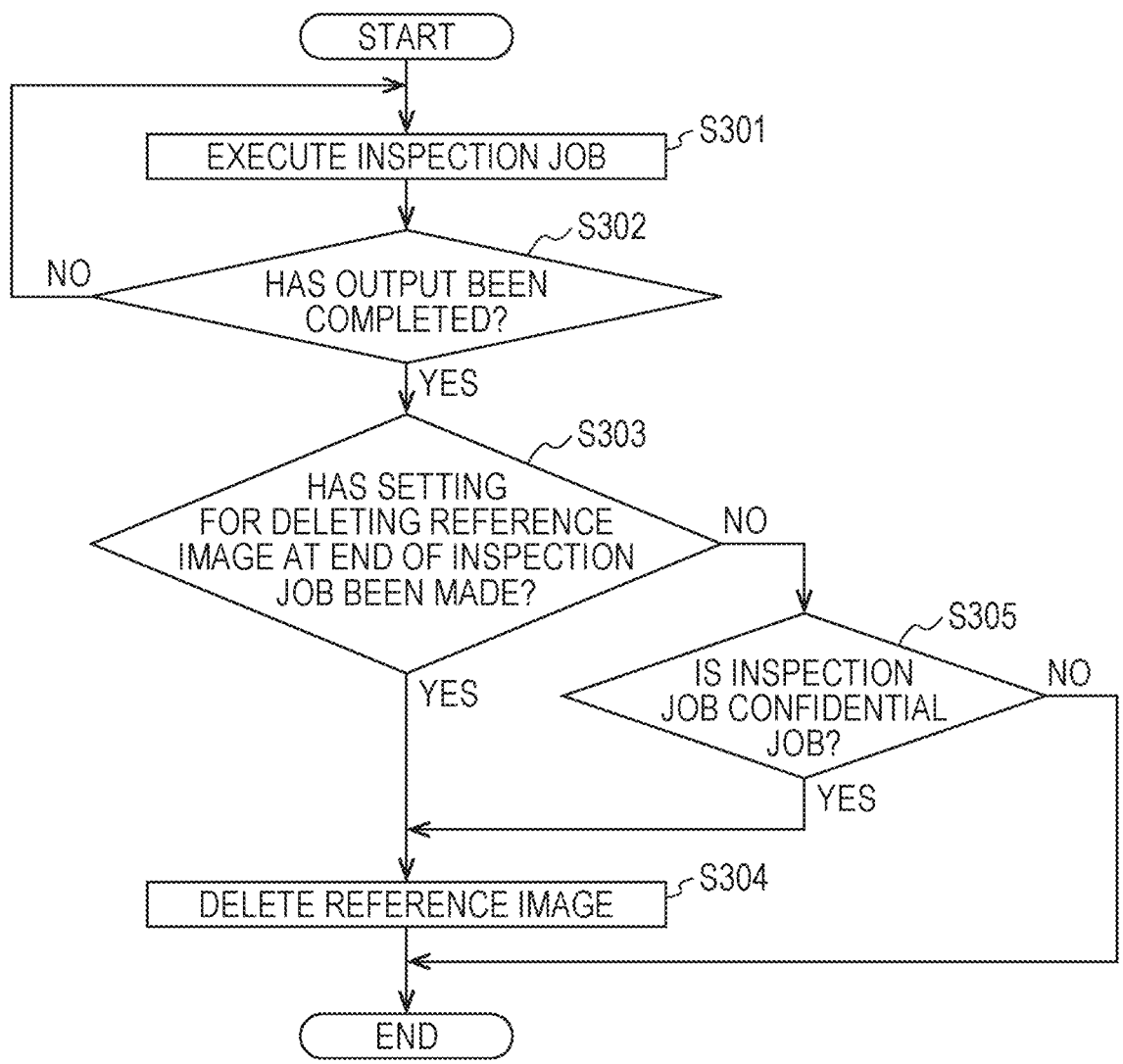
FIG. 6 is a flowchart showing an operation of the image forming system.

FIG. 6 is a flowchart showing an operation of the image forming system in a case where the fourth condition and the fifth condition are set as the predetermined condition for deleting a reference image.

The controller 11 executes an inspection job until the output is completed (S301 and S302).

If the controller 11 determines that the output of the inspection job has been completed (S302: YES), the controller 11 determines whether a setting for deleting an inspection image at the end of an inspection job has been made (S303). If the controller 11 determines that the setting for deleting an inspection image at the end of an inspection job has been made (S303: YES), the controller 11 deletes the reference image used for inspection in the inspection job from the storage 21 (S304).

If the controller 11 determines that the setting for deleting an inspection image at the end of an inspection job has not been made (S303: NO), the controller 11 determines whether the executed inspection job is a confidential job (S305). That is, the controller 11 determines whether the confidentiality level of the inspection job is set to a predetermined level or higher. If the controller 11 determines the executed inspection job not to be a confidential job (S305: NO), the controller 11 ends the process.

If the controller 11 determines the executed inspection job to be a confidential job (S305: YES), the controller 11 deletes the reference image used for inspection in the inspection job from the storage 21 (S304).

FIG. 7 is a flowchart showing an operation of the image forming system in a case where the seventh condition is set as the predetermined condition for deleting a reference image.

The controller 11 starts storing a reference image into the storage 21 (S401) and determines whether the storage 21 stores a reference image having the same file name as the file name of the reference image to be stored (S402). If the controller 11 determines that the storage 21 does not store any reference image having the same file name as the file name of the reference image to be stored (S402: NO), the controller 11 stores the new reference image into the storage 21 (S405).

If the controller 11 determines that the storage 21 stores a reference image having the same file name as the file name of the reference image to be stored is stored (S402: YES), the controller 11 determines whether a setting for storing a reference image in an overwriting manner has been made (S403). The controller 11 determines that the setting for storing a reference image in an overwriting manner has been made (S403: YES), the controller 11 deletes the reference image having the same file name already stored in the storage 21 (S404) and stores the new reference image into the storage 21 (S405).

If the controller 11 determines that the setting for storing a reference image in an overwriting manner has not been made (S403: NO), the controller 11 changes the file name of the new reference image (S406) and stores the new reference image into the storage 21.

This embodiment has the effects described below.

In a case where the data amount of the reference images generated and stored when an automatic inspection function was executed is equal to or larger than a predetermined amount, each reference image satisfying a predetermined condition is deleted. As a result, it is possible to prevent a decrease in productivity, without forcing the user to manually delete unnecessary reference images to avoid shortage of capacity in the storage due to the reference images generated and stored when an automatic inspection function is executed.

Further, from among the reference images stored in the storage, a reference image to be used for inspection of an inspection target image is selected by the user, and the inspection target image is inspected with the use of the selected reference image. Because of this, it is possible to conduct an inspection using an appropriate reference image, and improve waste paper detection accuracy accordingly.

Furthermore, the usage frequency of each reference image is stored, and the predetermined condition for deleting a reference image is the first condition that the usage frequency of a reference image stored in the storage is equal to or lower than a predetermined frequency. Because of this, it is possible to appropriately delete a reference image with a low degree of necessity.

Further, the date and time of storage, the date and time of the most recent editing, and the date and time of the most recent usage for inspection are stored for each reference image, and the predetermined condition for deleting a reference image is the second condition that the date and time of storage, the date and time of the most recent editing, and/or the date and time of the most recent usage for inspection is earlier than a predetermined time and date. Because of this, it is possible to appropriately delete a reference image with a low degree of necessity.

Furthermore, in a case where a plurality of reference images to be used for inspection in an inspection job are generated and stored into the storage in the sample output mode, one of the generated reference images is associated with the first print job, and the predetermined condition for deleting a reference image is the third condition that the reference image is not associated with the inspection target job. Because of this, it is possible to conduct an inspection using an appropriate reference image, and improve waste paper detection accuracy accordingly.

Further, a confidentiality level setting instruction is received for an inspection job, and the predetermined condition for deleting a reference image is the fourth condition that the reference image is to be used for inspection of an inspection target image formed through execution of an inspection job set at a confidentiality level equal to or higher than a predetermined level. Because of this, it is possible to prevent leakage of confidential information having a high confidentiality level by deleting a reference image including information that should be treated as confidential information such as personal information.

Furthermore, an instruction to delete the reference image used for inspection of an inspection target image formed on the basis of an inspection job after the inspection job is executed is received from the user, and the predetermined condition for deleting a reference image is the fifth condition that the reference image has been used for inspection in the executed inspection job. Because of this, it is possible to appropriately delete the unnecessary reference image used for inspection in an inspection job that does not involve reprinting.

Further, an instruction to set an expiration date of a reference image, the number of inspection jobs for inspecting inspection target images using a reference image, and/or the number of paper sheets on which inspection target images are inspected with the use of a reference image is received from the user and is set, and the predetermined condition for deleting a reference image is the sixth condition that the reference image has reached the set reference image expiration date, the set number of inspection jobs, and/or the set number of paper sheets. Because of this, it is possible to appropriately delete a reference image with a low degree of necessity.

Furthermore, in a case where another reference image having the same file name as the reference image to be stored into the storage is already stored in the storage, an instruction to store a reference image in an overwriting manner is received from the user and is set, and the predetermined condition for deleting a reference image is the seventh condition that the reference image corresponds to the other reference image in a case where the setting for storing a reference image in an overwriting manner and a reference image having the same file name as that of the reference image is already stored in the storage when the reference image is to be stored into the storage. Because of this, it is possible to leave a necessary reference image, and delete an unnecessary reference image, in accordance with the user's intention.

Further, the reference images stored in the storage are displayed, the reference image to be deleted from among the displayed reference images is received by the user, and the predetermined condition for deleting a reference image is the eighth condition that the reference image is the selected reference image. Because of this, it is possible to delete a less necessary reference image at appropriate timing.

Furthermore, the predetermined condition for deleting a reference image is the ninth condition that the reference image is a reference image generated through execution of a reference image generation job in different print settings from the print settings of an inspection job, in a case where a plurality of reference images to be used in inspecting inspection target images formed through execution of an inspection job are generated and stored by executing a plurality of reference image generation jobs having different print settings. Because of this, it is possible to appropriately delete a reference image that has become unnecessary due to a print setting error or the like.

Further, an inspection job is associated with a reference image and is stored into the storage or into a storage device other than the storage, and the predetermined condition for deleting a reference image is the tenth condition that the reference image is a reference image associated with a stored inspection job in a case where the print settings for the stored inspection job have been updated. Because of this, it is possible to appropriately delete a reference image that has become unnecessary due to a print setting error or the like.

The configurations of the image forming system, the image forming apparatus, and the program described above are principal configurations for describing the features of the above embodiment. Embodiments of the present invention are not limited to the above embodiment, and various modifications may be made to it within the scope of the claimed invention. Further, the configurations of general image forming systems and the like are not excluded.

The means and the methods for performing various processes in the image forming system according to the above-described embodiment can also be obtained through a special-purpose hardware circuit or a programmed computer. The program described above may be provided via a computer-readable recording medium such as a USB memory or a DVD (Digital Versatile Disc)-ROM or may be delivered online via a network such as the Internet. In this case, the programs recorded in a computer-readable recording medium are normally transferred to and stored into a storage such as a hard disk. Alternatively, the program described above may be provided as independent application software or may be incorporated as a function into the software of a device such as a detector.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image inspection apparatus comprising:
a hardware processor that controls execution of an inspection job for executing an inspection for a first read image generated by reading a first recording medium forming one image thereon, on the basis of a reference image,
wherein the hardware processor acquires a plurality of second read images generated by reading each of a plurality of second recording mediums each forming the one image thereon, and generates the reference image used for the inspection for the first read image,
wherein the hardware processor stores the generated reference image in a storage, and
wherein the image inspection apparatus accepts a first operation for using a reference image generated associated with a new image formation for generating the reference image by an image forming apparatus, or a second operation for using a reference image stored in the storage without associated with the new image formation, every inspection job.

2. The image inspection apparatus according to claim 1, wherein the image inspection apparatus further accepts setting of an inspection level for the first read image.

3. The image inspection apparatus according to claim 1, wherein the hardware processor executes determination whether or not any stain exists on the first read image on the basis of the reference image, as an inspection for the first read image.

4. The image inspection apparatus according to claim 1, wherein the first operation is accepted in a setting screen that accepts setting of the inspection in the inspection job.

5. The image inspection apparatus according to claim 1, wherein the second operation is accepted in a setting screen that accepts setting of the inspection in the inspection job.

6. The image inspection apparatus according to claim 1, wherein the reference image and setting of the inspection in the inspection job are stored in the storage in association with each other every inspection job.

7. The image inspection apparatus according to claim 1, wherein the hardware processor further deletes the reference image stored in the storage.

8. A non-transitory storage medium including an image inspection program executed by a computer of an image inspection apparatus that controls execution of an inspection job for executing an inspection for a first read image generated by reading a first recording medium forming one image thereon, on the basis of a reference image, the program causing a computer to execute the steps of:
acquiring a plurality of second read images generated by reading each of a plurality of second recording mediums each forming the one image thereon, and generating the reference image used for the inspection for the first read image; and
storing the generated reference image in a storage,
wherein the image inspection program accepts a first operation for using a reference image generated associated with a new image formation for generating the reference image by an image forming apparatus, or a second operation for using a reference image stored in the storage without associated with the new image formation, every inspection job.

9. The non-transitory storage medium according to claim 8, wherein the program further causes the computer to execute a step of accepting setting of an inspection level for the first read image.

10. The non-transitory storage medium according to claim 8, wherein the program executes determination whether or not any stain exists on the first read image on the basis of the reference image, as an inspection for the first read image.

11. The non-transitory storage medium according to claim 8, wherein the first operation is accepted in a setting screen that accepts setting of the inspection in the inspection job.

12. The non-transitory storage medium according to claim 8, wherein the second operation is accepted in a setting screen that accepts setting of the inspection in the inspection job.

13. The non-transitory storage medium according to claim 8, wherein the reference image and setting of the inspection in the inspection job are stored in the storage in association with each other every inspection job.

14. The non-transitory storage medium according to claim 8, wherein the program further causes the computer to execute a step of deleting the reference image stored in the storage.

15. An image inspection system comprising:
an image forming section that forms an image on a recording medium;
an image reading section that reads the recording medium having the image formed by the image forming section and generates a read image; and
a hardware processor that controls execution of an inspection job for executing an inspection for a first read image generated by reading a first recording medium forming one image thereon by the image forming section with the image reading section, on the basis of a reference image,
wherein the hardware processor acquires a plurality of second read images generated by reading each of a plurality of second recording mediums each forming the one image thereon, and generates the reference image used for the inspection for the first read image,
wherein the hardware processor stores the generated reference image in a storage, and
wherein the image inspection system accepts a first operation for using a reference image generated associated with a new image formation for generating the reference image by the image forming section, or a second operation for using a reference image stored in the storage without associated with the new image formation, every inspection job.

16. The image inspection system according to claim 15, wherein the image inspection system further accepts setting of an inspection level for the first read image.

17. The image inspection system according to claim 15, wherein the hardware processor executes determination whether or not any stain exists on the first read image on the basis of the reference image, as an inspection for the first read image.

18. The image inspection system according to claim 15, wherein the first operation is accepted in a setting screen that accepts setting of the inspection in the inspection job.

19. The image inspection system according to claim 15, wherein the second operation is accepted in a setting screen that accepts setting of the inspection in the inspection job.

20. The image inspection system according to claim 15, wherein the reference image and setting of the inspection in the inspection job are stored in the storage in association with each other every inspection job.

21. The image inspection system according to claim 15, wherein the hardware processor further deletes the reference image stored in the storage.

22. The image inspection system according to claim 15, wherein the image inspection system further comprises a first discharge tray and a second discharge tray that discharge the first recording medium,
    wherein the first recording medium determined to have no failure in the first read image is discharged to the first discharge tray, and
    wherein the first recording medium determined to have any failure in the first read image is discharged to the second discharge tray.

\* \* \* \* \*